(12) United States Patent
Aciicmez et al.

(10) Patent No.: US 8,019,946 B2
(45) Date of Patent: Sep. 13, 2011

(54) METHOD AND SYSTEM FOR SECURING INSTRUCTION CACHES USING CACHE LINE LOCKING

(75) Inventors: Onur Aciicmez, San Jose, CA (US);
Jean-Pierre Seifert, San Jose, CA (US);
Qingwei Ma, Fremont, CA (US);
Xinwen Zhang, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 476 days.

(21) Appl. No.: 12/183,908

(22) Filed: Jul. 31, 2008

(65) Prior Publication Data

US 2010/0030964 A1    Feb. 4, 2010

(51) Int. Cl.
*G06F 12/08* (2006.01)
(52) U.S. Cl. .. 711/125; 711/119; 711/138; 711/E12.017

(58) Field of Classification Search .................. 711/125, 711/119, 138, E12.017
See application file for complete search history.

(56) References Cited

U.S. PATENT DOCUMENTS 6,044,478 A * 3/2000 Green ............................. 714/42
6,397,301 B1 * 5/2002 Quach et al. .................. 711/138

* cited by examiner

*Primary Examiner* — Yong Choe
(74) *Attorney, Agent, or Firm* — Beyer Law Group LLP

(57) ABSTRACT

A method and system is provided for securing micro-architectural instruction caches (I-caches). Securing an I-cache involves providing security critical instructions to indicate a security critical code section; and implementing an I-cache locking policy to prevent unauthorized eviction and replacement of security critical instructions in the I-cache. Securing the I-cache may further involve dynamically partitioning the I-cache into multiple logical partitions, and sharing access to the I-cache by an I-cache mapping policy that provides access to each I-cache partition by only one logical processor.

33 Claims, 11 Drawing Sheets

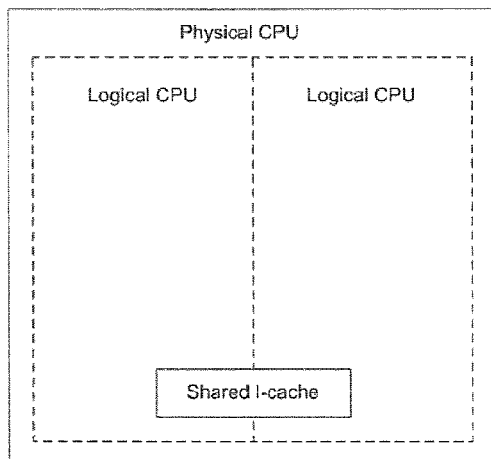
FIG. 1
Prior art
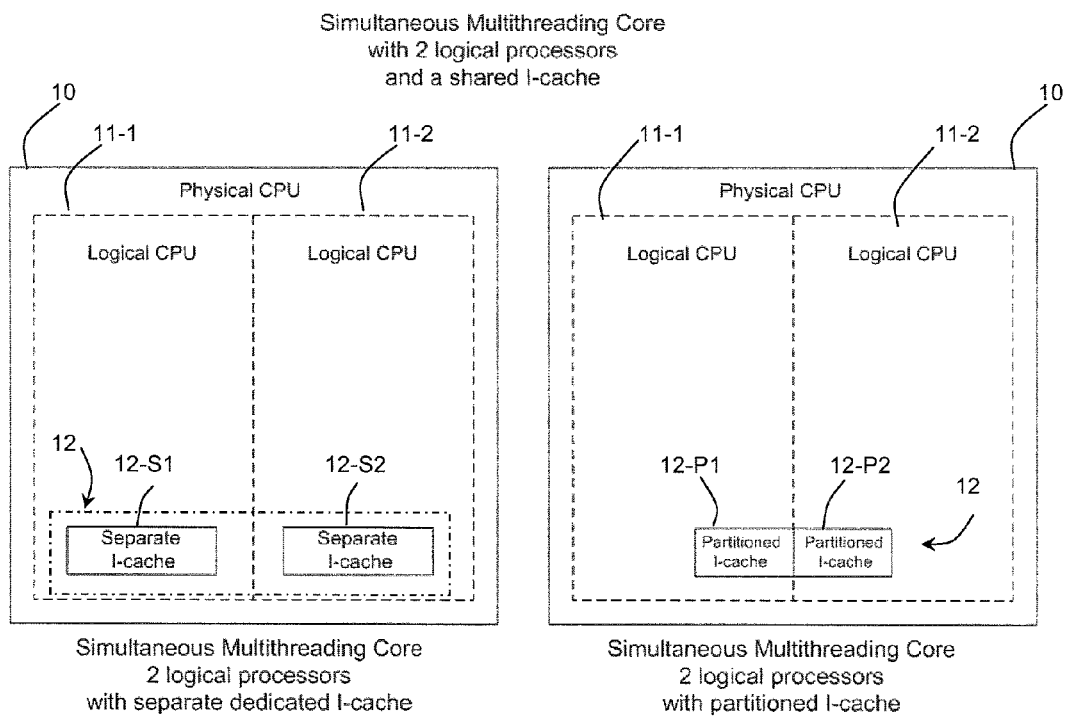
FIG. 3
FIG. 4

METHOD AND SYSTEM FOR SECURING INSTRUCTION CACHES USING CACHE LINE LOCKING

FIELD OF THE INVENTION

The present invention relates to instruction caches, and in particular, to securing instruction caches.

BACKGROUND OF THE INVENTION

Current microprocessors employ an instruction cache (I-cache) to increase the performance of a system. An I-cache stores the most frequently executed instructions and provides the processor easy and fast access to these instructions. While increasing the performance of the system, I-cache architectures also create security weaknesses.

One security weakness in conventional implementations of I-cache structures involves shared I-cache units in simultaneous multithreaded (SMT) and/or multi-core systems, wherein I-cache units are shared between different logical or physical microprocessors (FIG. 1). If more than two processes are executing simultaneously on the same system and if the I-cache is shared between these processes, then a malicious process can indirectly observe the execution of security critical applications and discover confidential values used therein by analyzing I-cache modifications.

Another security weakness in conventional implementations of I-cache structures involves ability of a malicious process to evict the entries of cryptographic processes from the I-cache, which enables an adversary to spy on the execution of cryptographic operations.

BRIEF SUMMARY OF THE INVENTION

The present invention provides a method and system for securing micro-architectural instruction caches (I-caches). One embodiment involves providing security critical instructions to indicate a security critical code section; and implementing an I-cache locking policy to prevent unauthorized eviction and replacement of security critical instructions in the I-cache.

Securing the I-cache may further involve dynamically partitioning the I-cache into multiple logical partitions, and sharing access to the I-cache by an I-cache mapping policy that provides access to each I-cache partition by only one logical processor.

These and other features, aspects and advantages of the present invention will become understood with reference to the following description, appended claims and accompanying figures.

BRIEF DESCRIPTION OF THE DRAWINGS

FIG. 1 shows a conventional instruction cache (I-cache) share between two logical processes.

FIG. 3 shows an I-cache system including dedicated I-cache modules.

FIG. 4 shows an I-cache system including a partitioned I-cache module, according to an embodiment of the invention.

DETAILED DESCRIPTION OF THE INVENTION

The present invention provides a method and system for securing micro-architectural instruction caches. One embodiment involves implementing partitioned or separate I-cache modules in a processor to prevent I-cache analysis on logical or physical multi-core microprocessors with simultaneous multithreading. In one example, a single I-cache is partitioned into separate partitions, wherein each partition is used by a different processor. In another example, a dedicated I-cache is used for each logical and physical processor.

Further, for additional security, an I-cache locking policy is utilized to reduce possibility of eviction of critical instructions.

Cache mapping strategy involves transferring data from main memory into the I-cache and referenced by the CPU. Cache mapping determines which I-cache sets can store the content of a given memory location. Cache replacement strategy involves identifying a candidate I-cache block, content of which will be evicted to write new data into the I-cache.

Figure 2:
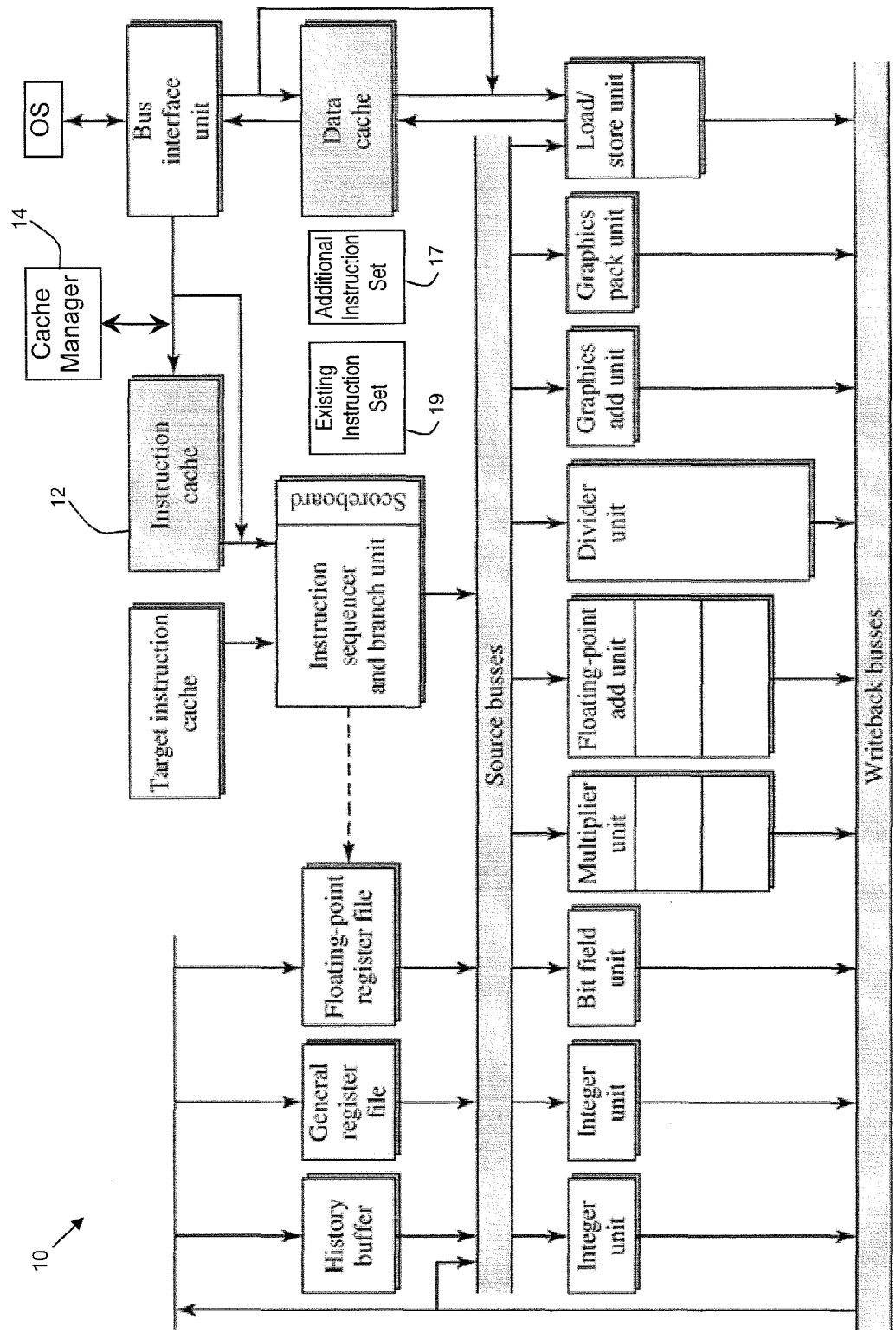
FIG. 2 shows a processing system including an I-cache system, according to an embodiment of the invention.

FIG. 2 shows a functional block diagram of a computing environment architecture 10 implementing an embodiment of the present invention. The architecture 10 includes an I-cache system 12 and a cache manager 14. The cache manager 14 controls the function of the I-cache. In one embodiment, the cache manager 14 comprises the control logic of the I-cache and is considered as a part of I-cache instead of separate logic. This control logic implements dynamic detection of critical code sections/processes (possibly in collaboration with the operating system), and dynamic I-cache partitioning including determining the number of I-cache partitions, size of partitions, assignment of partitions, etc. Furthermore, the I-cache manager implements generating substantially random (e.g., random or pseudorandom) numbers for substantially random I-cache instructing mapping, updating seeds, substantially randomizing the index section of the instruction address, etc. The cache manager also implements mapping policy, replacement algorithm, etc.

The I-cache system 12 may comprise one or more I-cache modules. In one implementation, for each physical or logical processor, different physical I-cache locations are used, whether in the same I-cache module or as separate independent I-cache modules.

FIG. 3 shows two separate (dedicated) I-cache modules 12-S1 and 12-S2 corresponding to the two logical processors 11-1, 11-2, respectively. FIG. 4 shows an example implementation of the I-cache system 12 for a SMT processor with two logical processors 11-1, 11-2, according to the invention.

FIG. 4 shows a shared physical I-cache module 12 that is partitioned into two partitioned areas 12-P1, 12-P2, corresponding to the two logical processors 11-1, 11-2, respectively. The partitioning can be implemented in many ways without changing the size of the I-cache.

Figure 5:
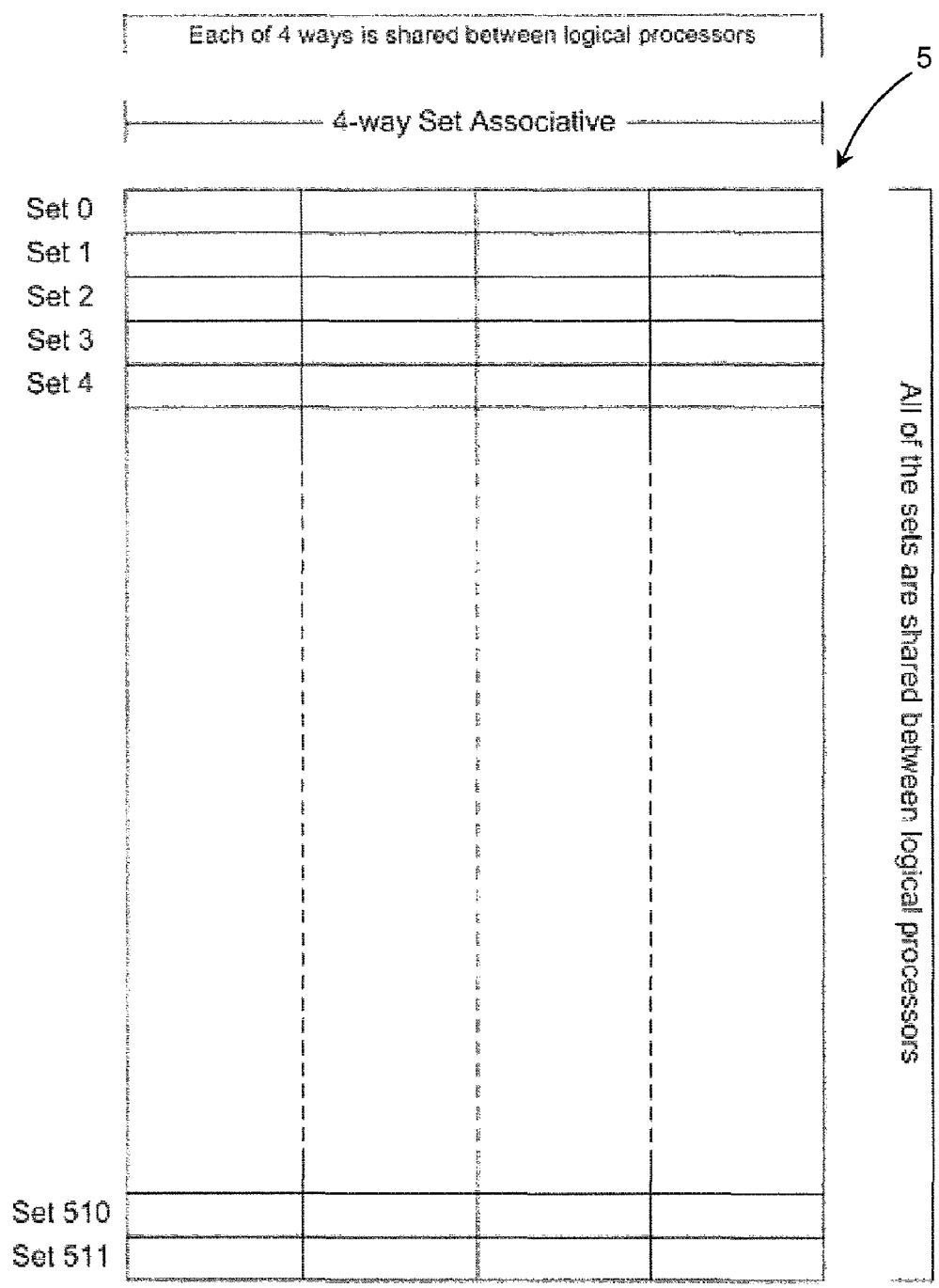
FIG. 5 shows an example 4-way set associative I-cache.
Figure 6:
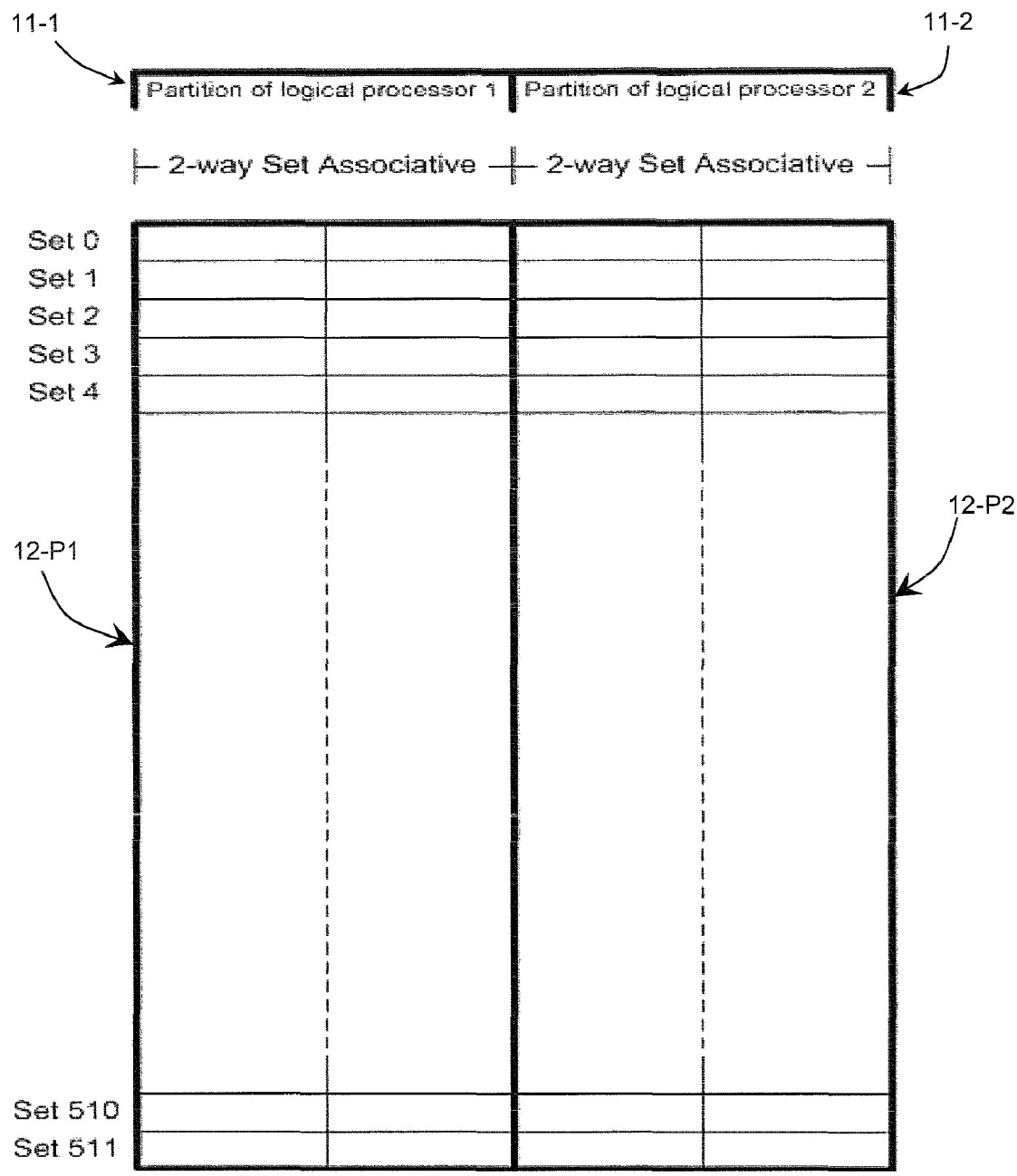
FIGS. 6-7 show examples of partitioning the I-cache of FIG. 5, according to the invention.
Figure 7:
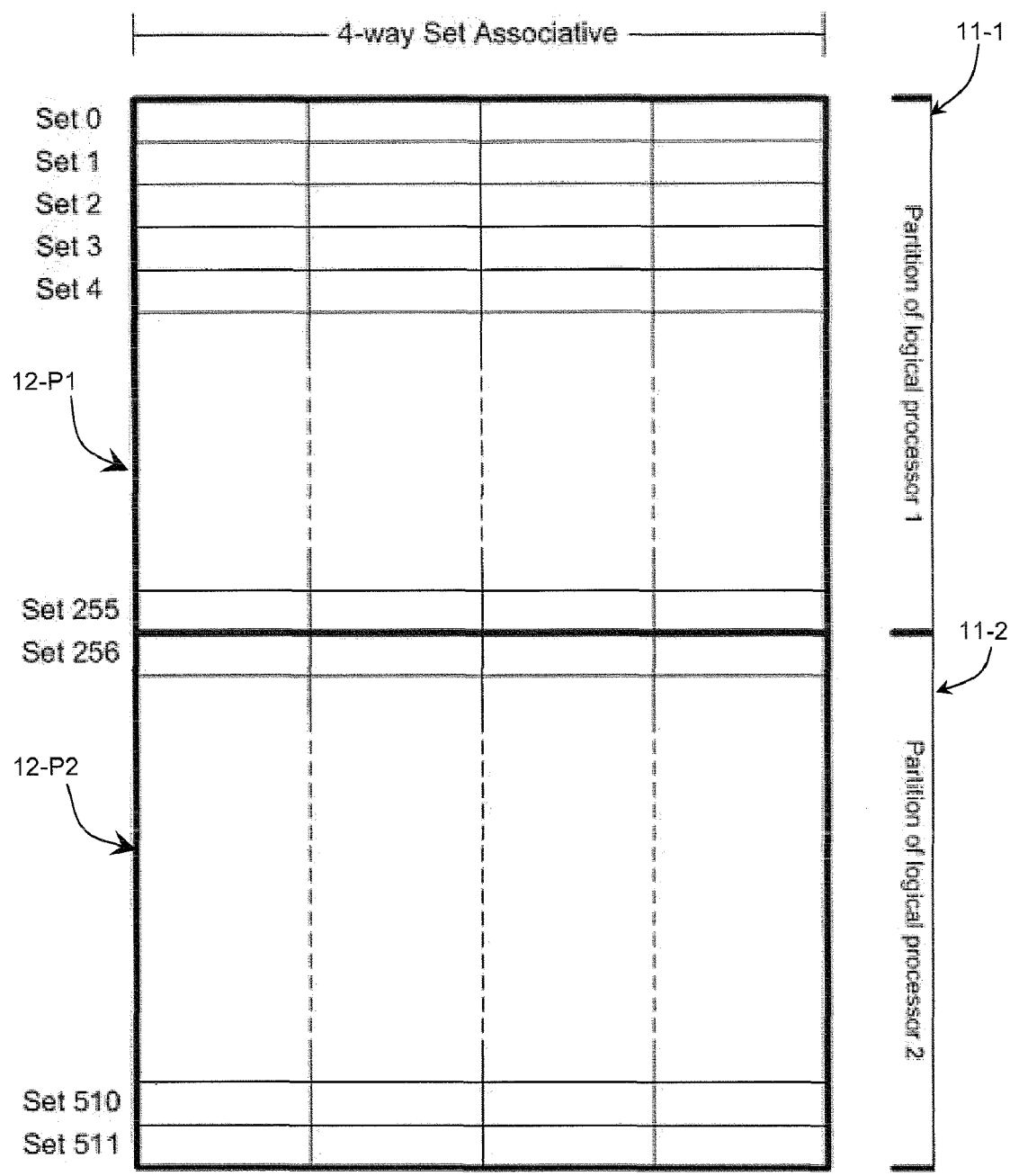

For example, a 4-way set associative I-cache 5 with 512 sets (FIG. 5) can be partitioned into two 2-way associative I-caches 12-P1 and 12-P2 (FIG. 6) with the same amount of sets, or the I-cache 5 can be partitioned into two 4-way associative I-caches 12-P1 and 12-P2 (FIG. 7) with 256 sets. During run-time, the cache manager 14 can switch between one 4-way set associative I-cache and two 2-way associative I-caches.

In one example, a software module such as the operating system (OS) can set a flag to indicate whether a critical application is running on a logical processor. If the flag is set, the cache manager 14 does not allow sharing of the I-cache between logical processors. Instead, the cache manager 14 dynamically partitions the I-cache such that different logical processors do not use the same I-cache locations.

The partitioning need not be processor based, and it can be for example process based. The I-cache can be partitioned so that a specific process can have exclusive access to a partition and the remainder of the cache can be shared among other processes. Another alternative is to combine both approaches. For example, half of the I-cache can be assigned to a logical processor and the other half to another logical processor. Further, the first half of the I-cache can be repartitioned to provide a critical process exclusive access to a partition in that first half of the I-cache, and other processes running on the first logical process can share the remaining part of the first half of the I-cache.

In addition, the partitioning can be in various sizes (e.g., $\frac{1}{4}^{th}$ of an I-cache is assigned to a logical processor and the remaining $\frac{3}{4}^{th}$ to another other logical processor). This is useful for process-based partitioning. If there is a critical process and several other non-critical processes running on the system, it may be preferable (for performance) to allocate a small I-cache partition to the critical process and leave the larger portion shared among non-critical processes. One implementation involves using one bit for logical processor ID and dynamically appending it to the index part of the instruction address to realize partitioning. If the length of the appendable portion is kept dynamic and changing from 1 bit to N bits (under the control of the I-cache management logic), then several partitions can be generated as small as $\frac{1}{2}^{N}$ of the original I-cache size. This approach may also incorporate a management logic that makes several decisions during run time, including the number of partitions, the length of partitions, the assignment of partitions (e.g. which process/processor is assigned to which partition), etc.

The cache manager 14 is implemented to allow dynamic partitioning. For example, in FIG. 7, there are 512 cache sets in total. When said flag is not set by the OS, 512 cache sets can be used by both logical processors (i.e., shared). When said flag is set by the OS, the cache manager 14 implements dynamic switching, wherein half of the 512 cache sets are used by one logical processor and the other half of the 512 cache sets are used by the other logical processor (i.e., partitioned).

Figure 8:
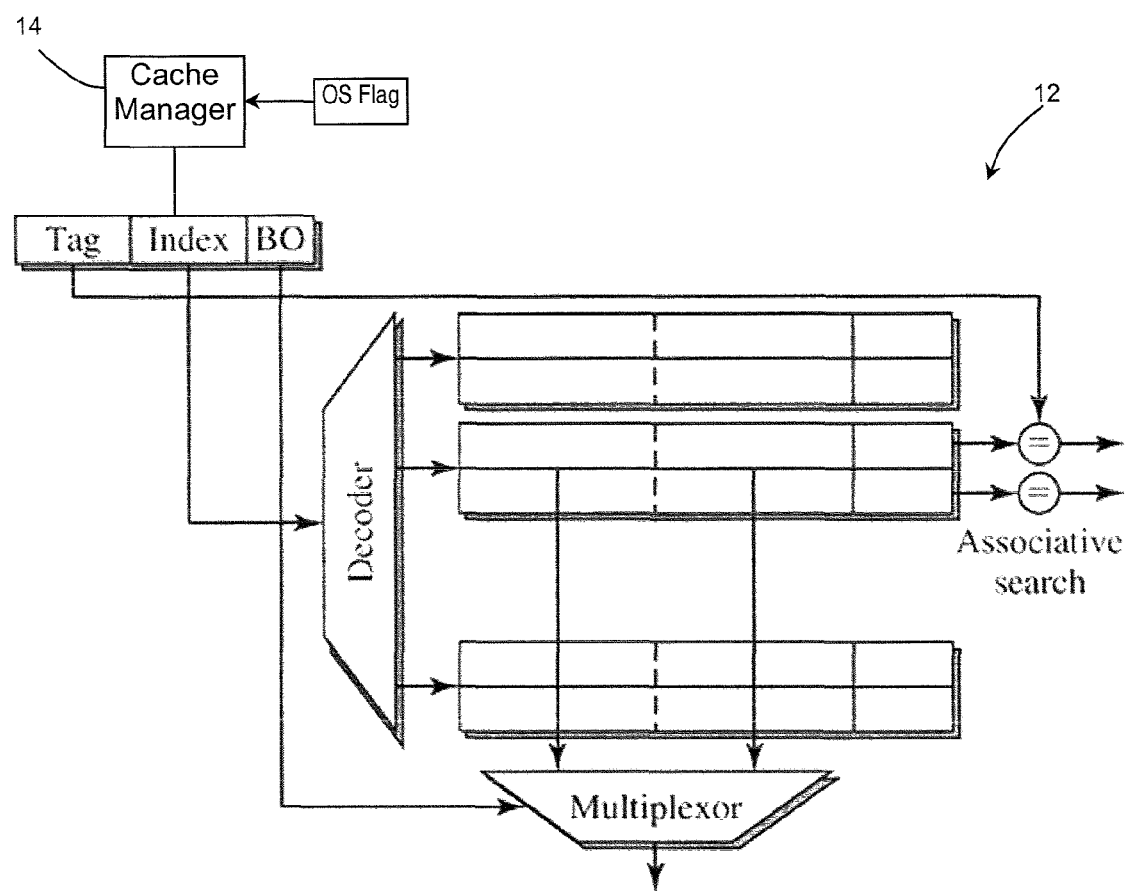
FIG. 8 shows a block diagram of an I-cache system, according to an embodiment of the invention.

The dynamic switching between shared and partitioned modes can be achieved by the cache manager 14 as a logic module to handle the index of the I-cache system 12 in FIG. 8. An example implementation in FIG. 8 is now described. Each cache location has a virtual address for an instruction, wherein the virtual address comprises different fixed sections (i.e., Tag, Index, BO).

If said OS flag is set, then the identification (ID) of the logical processor (e.g., either 0 or 1, assuming there are only 2 logical processors) that access the I-cache can be appended in front of the Index of the I-cache access to generate a new Index.

The new Index can be either less than 256 (e.g., maps to the upper half 12-P1 of the I-cache, FIG. 7) if it comes from logical processor 0 (e.g., logical processor 11-1), or it can be higher than 255 (e.g., maps to the lower half 12-P2 of the I-cache) if it comes from logical processor 1 (logical processor 11-2). The Size and Tag logic of the I-cache can be modified accordingly.

For example, assume that the length of the tag is A bits and the index is B bits. In this case, a cache has $2^B$ sets. If the I-cache is partitioned by half into two, each partition will need an index of B-1 bits. In this example, processor ID is appended (i.e., either a 0 or 1), in front of the index. In this case, this bit determines the partition (e.g. upper of lower half in FIG. 7) and the rest of the index (i.e., B-1 bits) specifies the index of that partition. The first bit of the original un-appended index (the first bit of the B-bit index section) is not used, and this necessitates enlarging the tag section by 1 bit. For example, if the address of an instruction is:

0001 . . . 0101 1001 . . . 0011 01 where original tag=(0001 . . . 0101), original index=(1001 . . . 0011) and offset=01, then the I-cache is partitioned into 2 equal parts, the new tag would be (0001 . . . 0101 1) and the new index should become (x 001 . . . 0011) where x is the appended processor ID.

To partition the I-cache into four equal parts, then the tag=(0001 . . . 0101 10) and original index=(xy 01 . . . 0011). To partition the I-cache into eight equal parts, then the tag= (0001 . . . 0101 100) and original index (xyz 1 . . . 0011). And, so on.

Figure 9:
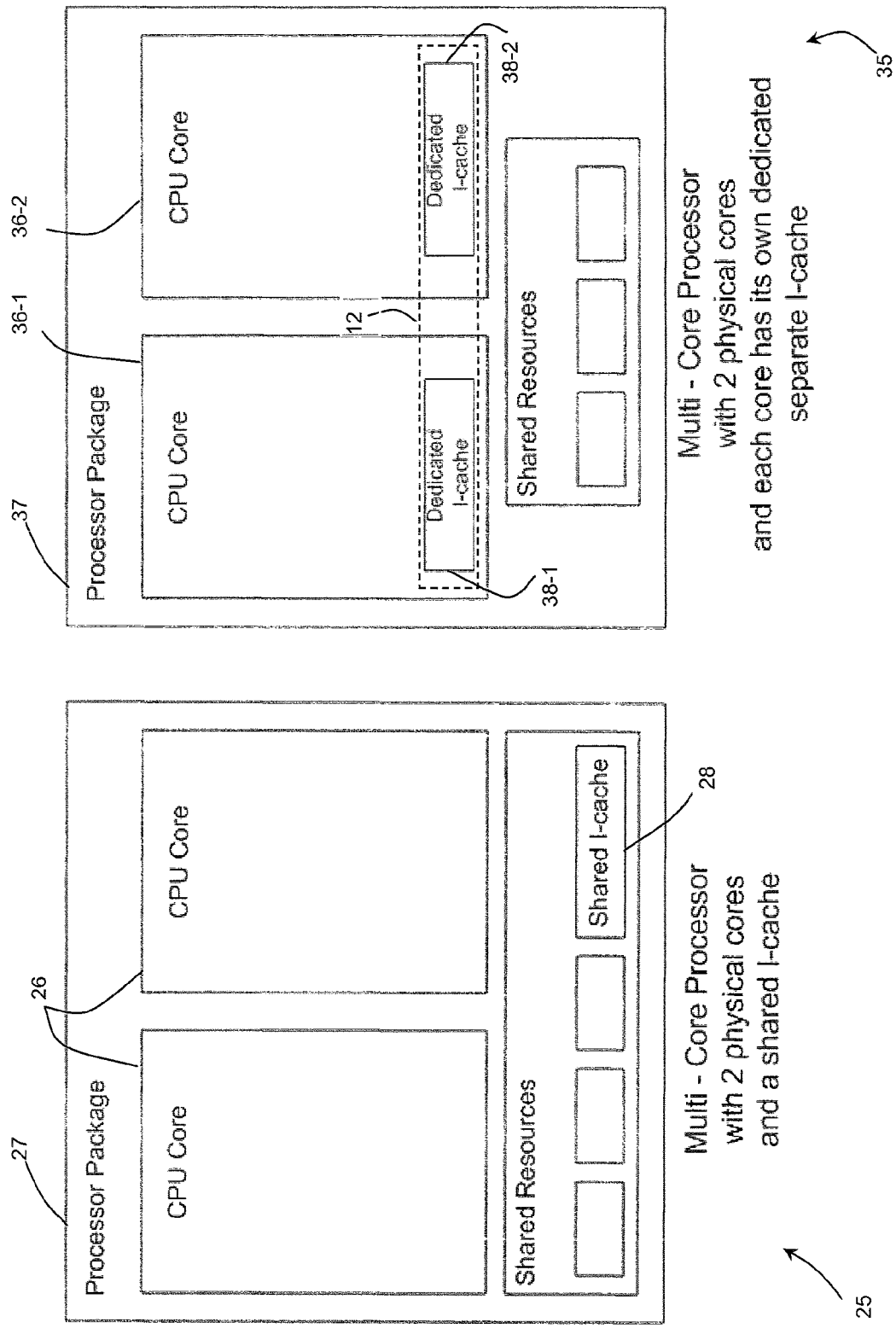
FIG. 9A shows a block diagram of a typical I-cache system with a shared I-cache.
FIG. 9B shows a block diagram of an I-cache system with dedicated I-cache modules, according to another embodiment of the invention.

In a typical multi-core system 25 shown in FIG. 9A, there are multiple physical processor cores 26 in the same package 27 and resources including a typical I-cache 28 that is shared between these cores. According to an example dual-core system 35 in FIG. 9B according to the present invention, two physical processor cores 36-1, 36-2 reside in a single processor package 37 and separate dedicated unshared I-cache modules 38-1, 38-2, are implemented in the I-cache system 12, wherein each processor core only uses a dedicated unshared I-cache module.

For further security safeguarding of I-caches, the invention further provides I-cache locking to prevent unauthorized eviction of security critical I-cache entries. Security critical instructions comprise instructions wherein disclosure of the details of their execution may lead to the compromise of an application/process or the entire platform or may lead to the disclosure of secrets in a process/application/platform. The execution details include but not limited to the type of the operation, the operand values, the order of the executed instructions, the change in the state of microarchitectural CPU components (e.g. I-cache, data cache, branch prediction unit, etc.).

One embodiment involves a locking mechanism which can disable unauthorized intentional I-cache evictions of security critical instructions. A security application (e.g., a cipher process), can specify which of its instructions are security critical and shall not be evicted (unless authorized). Then, the microprocessor can handle such instructions more securely.

One implementation comprises an architecture which involves specifying which instructions are critical in a code segment (e.g., software developers and/or compilers can specify such instructions), and the microprocessor keeps track of which cache lines contain critical instructions and which process these instructions belong to. Such architecture can be achieved in different ways, an example of which is described below.

Additional instructions 17 (FIG. 2) are added to the existing instruction set 19 of a microprocessor. Each existing instruction then has an equivalent additional instruction that performs the same function as the existing one, but the additional instruction is considered to be "security critical". As such, there are two sets of instructions: security critical instructions and non-critical instructions.

The existing set of instructions is considered to be the non-critical set by default. Then, the existing instruction set is cloned and a new encoding (i.e., binary representation of the instruction) is assigned for each additional instruction. This additional instruction forms the security critical instruction set. Note that there is a 1-1 and onto relation between security critical and non-critical instruction sets. The union of said two instruction sets forms a new instruction set of the microprocessor system.

Using the new instruction set, the microprocessor can determine whether an instruction is security critical or not. The microprocessor handles the security critical instructions such that such instructions cannot be evicted from the I-cache unless authorized. The I-cache system 12 (FIG. 2) achieves this functionality by including a new structure for each cache line to hold information as whether the instructions in the particular cache line are critical, and also which process they belong to. The operating system or software or firmware or a logic function maintains a data structure to keep track of critical processes and upon detection of a new critical process, updates this data structure.

Figure 10:
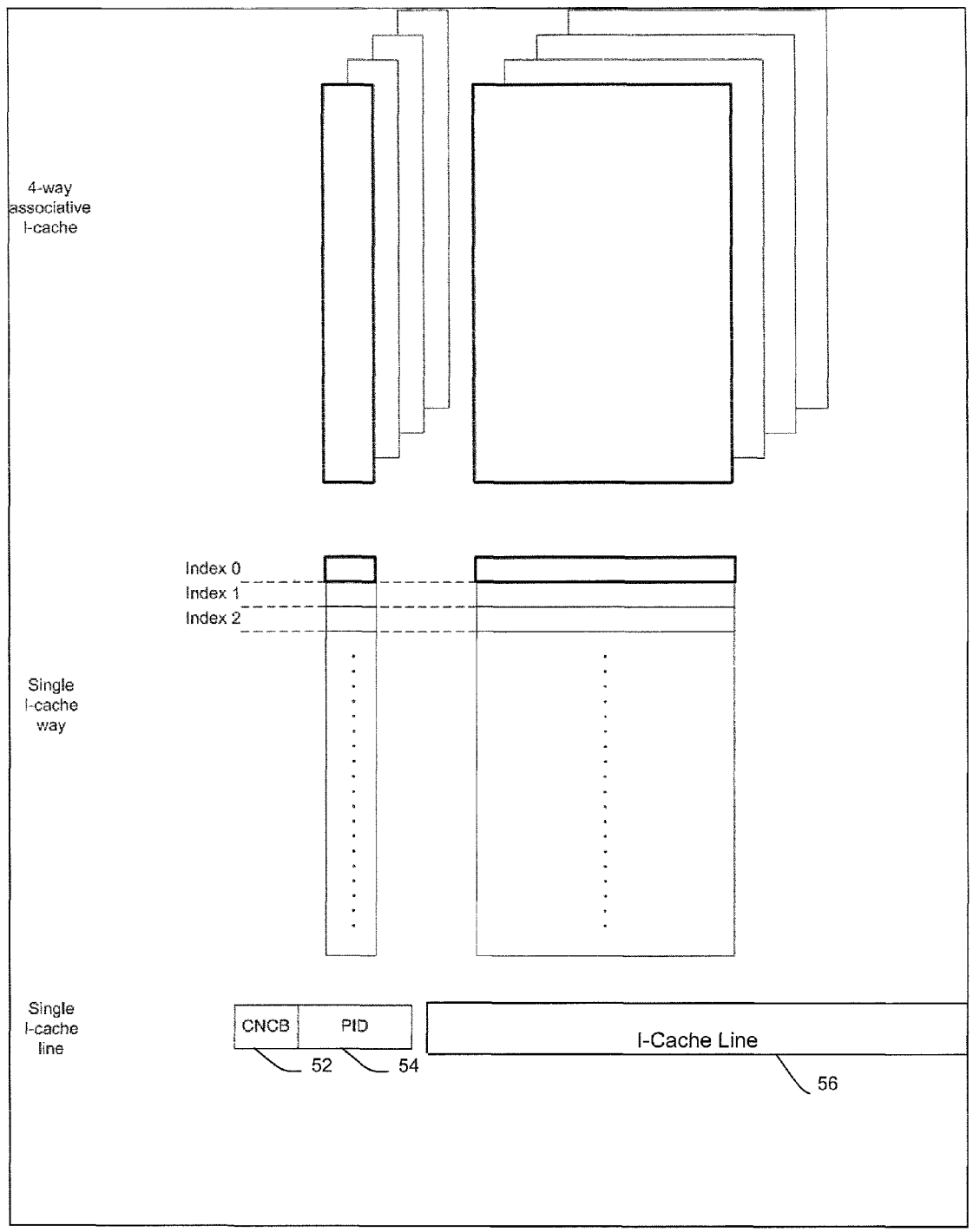
FIG. 10 shows a block diagram of an I-cache system implementing I-cache locking to prevent unauthorized eviction of security critical I-cache entries, according to another embodiment of the invention.

FIG. 10 shows example I-cache architecture 50 for the I-cache system 12, according to the invention, wherein said new structure includes a critical/non-critical bit (CNCB) 52 and a process identification tag (PID) 54. A resetting of CNCB 52 (e.g., to 0) denotes that the entry stored in a corresponding I-cache line 56 is not security critical and a setting of the CNCB 52 (e.g., to 1) denotes the corresponding entry 56 is critical. The PID 54 identifies which process the instructions in the corresponding I-cache line belong to.

Figure 11A:
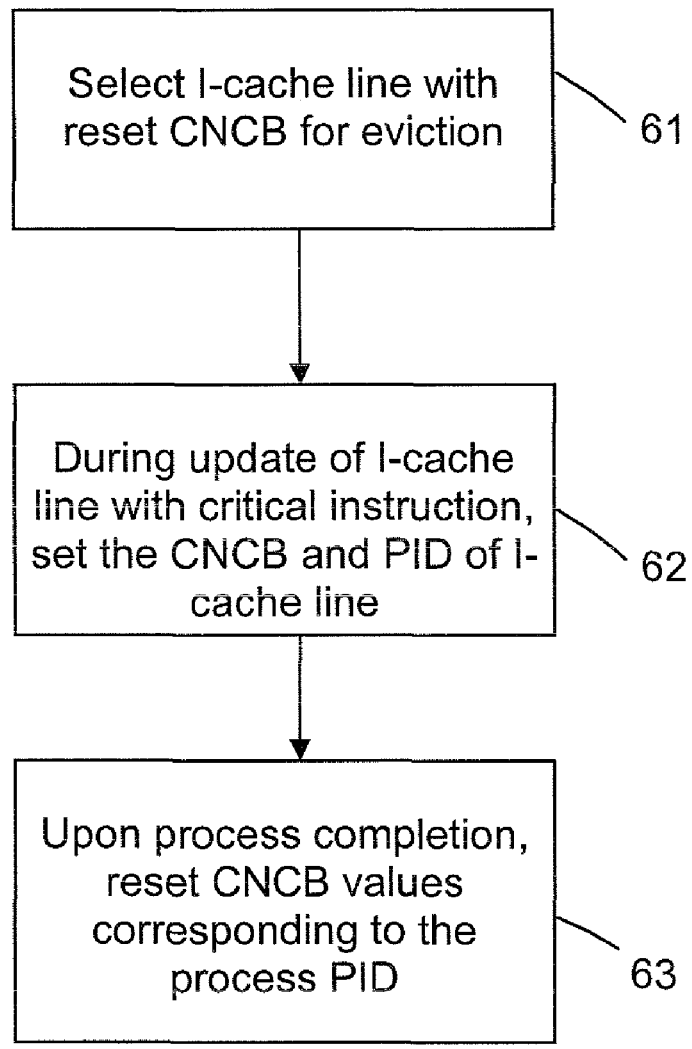
FIG. 11A shows an example process of I-cache locking, according to the invention.

In conventional systems with an insecure I-cache, when the microprocessor executes an instruction that is not already written into I-cache, an existing I-cache entry is evicted from the I-cache and a copy of the memory block, which the executed instruction resides in, is stored in I-cache. By contrast, according to the architecture 50, updating I-cache is implemented according to the process 60 in FIG. 11A, as follows:

Block 61: During the selection of the I-cache entries to be evicted, the CNCB values are checked and an I-cache line having a reset CNCB value (i.e., indicating non-critical instruction(s) therein) is selected for eviction.

Block 62: During the update of an I-cache line with a critical instruction block, the CNCB and PID values of the I-cache line are set (i.e., indicating critical instruction(s) therein).

Block 63: When a process is completed, the CNCB values in I-cache line that correspond to the PID of the process are reset, indicating non-critical instruction(s) in the I-cache line (operating system (OS) assistance may be utilized for this block).

Figure 11B:
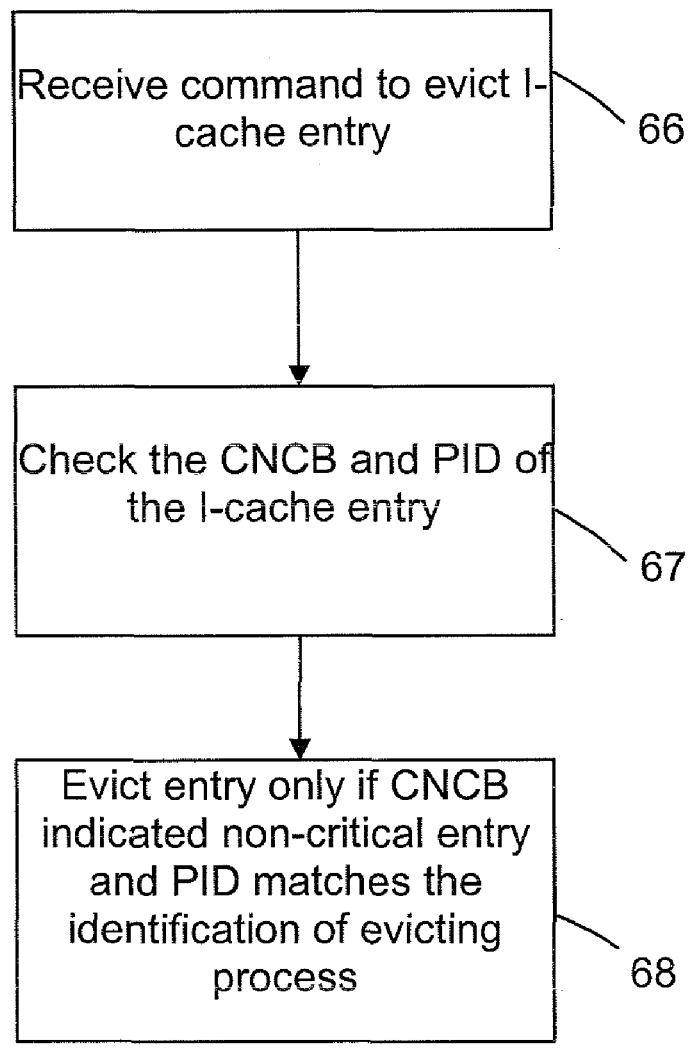
FIG. 11B shows an example process of I-cache access, according to the invention.

FIG. 11B shows an example I-cache access 65, according to the invention, including:

Block 66: Receiving command to evict I-cache entries for eviction by a process.

Block 67: For I-cache entries to be evicted, checking said CNCB and PID values for each entry to be evicted.

Block 68: Evicting an I-cache entry only if the CNCB indicates non-critical instruction and the identification of the process matches the PID of the I-cache entry.

The process 60 can be implemented by the cache manager 14 in the microprocessor, according to the invention. The OS provides an identification of the currently running process (PID) to the microprocessor (e.g., by setting a dedicated register). The microprocessor includes the cache system 12.

Figure 12:
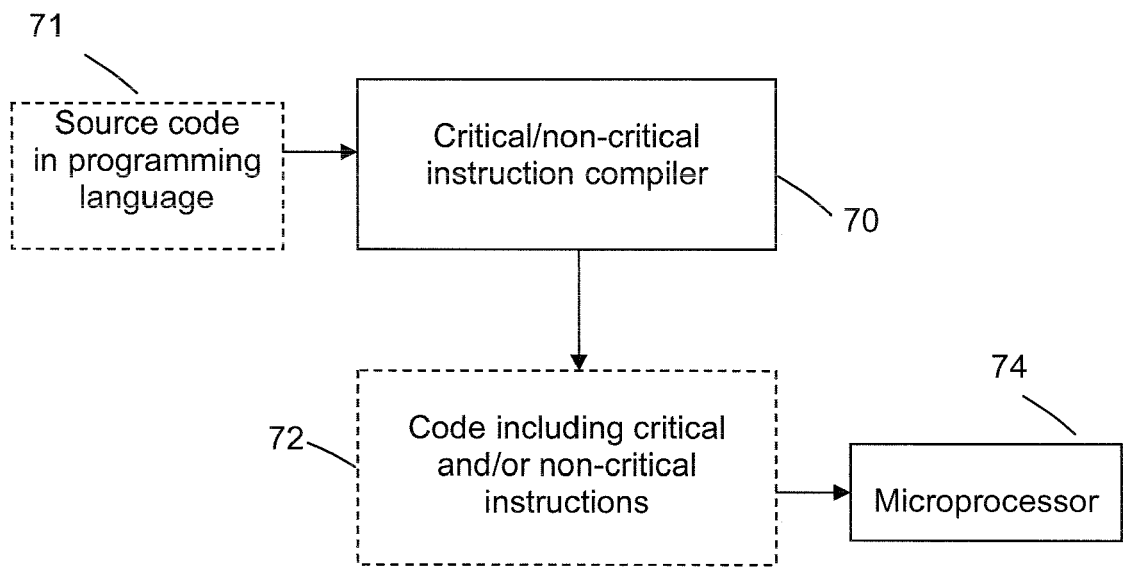
FIG. 12 shows an example compiler for generating code including security critical instructions, according to an embodiment of the invention.

FIG. 12 shows an example compiler 70 for receiving programming language text 71 (e.g., source code in C language text) and generating code 72 including security critical and/or non-critical instructions. The compiler 70 can be implemented as one or more software modules that translate text 71 into another computer language 72 (e.g., assembly code, object code) suitable for processing by other programs (e.g., a linker) or executable instructions for a microprocessor 74. The compiler may include a lexical analyzer, a parser and a code generator for generating the code 72 which may be machine code.

The I-cache partitioning process and/or the I-cache locking may be implemented for the same I-cache system 12, depending on the level of security desired. To use I-cache partitioning and I-cache locking together, the I-cache system can be implemented as FIG. 10, and also uses an index with a dynamic length for partitioning (i.e., dynamically expanding/shrinking index length for defining partition areas).

Static partitioning for dedicated I-caches involves placing different individual I-caches in the processor chip. One example of dynamic partitioning for two dedicated I-caches, involves changing control logic of a 4-way set associative I-cache (including, e.g., replacement and eviction logic) to two 2-way associative I-caches of the same size.

For dynamic I-cache partitioning during run-time, the system can switch between one 4-way set associative I-cache and two 2-way associative I-caches. For example, the OS can set a flag to indicate whether a critical application is running on a logical processor.

If said OS flag is set, the I-cache should not be shared between the logical processors because the process (which can be malicious) on a logical processor can attack the critical application running on the other logical processor. The processor architecture can be designed in a way to allow such dynamic partitioning. For static partitioning, there is no need to change any software. For dynamic partitioning, the OS (or similar software that controls the system) needs to be aware of the I-cache manager operations.

In another example, partitioning the I-cache further includes partitioning the I-cache into multiple logical partitions corresponding to multiple logical processors. Providing access to each I-cache partition includes providing access to each I-cache partition only by a corresponding logical processor.

Upon detecting execution of a critical process instruction on a logical processor, access to the corresponding I-cache by other logical processors is prevented. Preventing access to the I-cache partition by said other logical processors further includes dynamically repartitioning the I-cache to only allow access to a corresponding I-cache partition by the processor executing the critical process.

Partitioning the I-cache may involve modifying the mapping index of the I-cache to include logical processor identification, and sharing access to the I-cache may involve allowing access to different partitions of the I-cache by an I-cache mapping policy based on the logical processor identification. In addition, an I-cache locking policy may be implemented for each I-cache partition.

As such, implementing an I-cache locking policy may include: for each I-cache entry, providing: (i) a status value indicating that an instruction in the entry is security critical or non-critical, and (ii) process identification, PID, identifying the process the instruction belongs to and (iii) identification of the I-cache partition of this entry; and during the selection of I-cache entries to be evicted, checking said status value for each entry and selecting entries with non-critical instructions from the same I-cache partition to evict.

The I-cache locking policy may further include: during the update of an I-cache entry with a security critical instruction, setting said status value and the PID for the entry; and upon completion of a process, resetting the I-cache entry status values with instructions belonging to the completed process. The I-cache locking policy provides I-cache management for instruction processing, including preventing unauthorized eviction of an instruction identified as security critical from the I-cache. The processor instruction set is extended with an additional instruction set that are used to indicate security critical code sections, wherein a critical process executing these instructions identifies itself as a critical process and to indicate its critical code sections.

A one-to-one and onto relation with the existing instructions is not a necessary requirement. An alternative may involve adding two new instructions to the existing instruction set. One of the new instructions can be used to indicate the beginning of a security critical code section and the other can indicate the end of the security critical code section. For example, if the two instructions are "critical_section_start" and "critical_section_end" instructions, then an example code section may comprise:

```
instruction-1
instruction-2
instruction-3
.
.
.
instruction-n
critical_section_start
instruction-(n+1)
.
.
.
instruction-(n+k)
critical_section_end
instruction-(n+k+1)
.
.
.
``` and the processor (specifically the cache management module) can understand that the code section:

```
instruction-(n+1)
.
.
.
instruction-(n+k)
``` is security critical and can handle these instructions accordingly.

The information of security critical code sections/instructions (whether via having a duplicate set of existing instructions or having a few new instructions as described above) is provided to the cache management.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of instruction cache (I-cache) management, comprising:
   providing security critical instructions to indicate a security critical code section for an I-cache; and
   implementing an I-cache locking policy to prevent unauthorized eviction and replacement of security critical instructions in the I-cache;
   wherein implementing the I-cache locking policy further includes:
      for each I-cache entry: providing a status value indicating that an instruction in the entry is security critical or non-critical; and
      during the selection of I-cache entries to be evicted, checking said status value for each entry to be evicted and selecting entries with non-critical instructions to evict from the I-cache.

2. The method of claim 1 further including setting said status values for I-cache entries that include instructions for a critical process executing a critical instruction.

3. The method of claim 1 further comprising:
   partitioning the I-cache into multiple logical partitions; and
   sharing access to the I-cache by an I-cache mapping policy that provides access to each I-cache partition by only one logical processor;
   wherein implementing an I-cache locking policy further includes implementing an I-cache locking policy for each cache partition, to prevent unauthorized eviction of an instruction from the corresponding I-cache partition.

4. The method of claim 3, wherein partitioning the I-cache further includes partitioning the I-cache into multiple logical partitions corresponding to multiple logical processors.

5. The method of claim 1, wherein the instruction processing is implemented on a simultaneous multithreading (SMT) processor.

6. A method of instruction cache (I-cache) management, comprising:
   providing security critical instructions to indicate a security critical code section for an I-cache; and
   implementing an I-cache locking policy to prevent unauthorized eviction and replacement of security critical instructions in the I-cache;
   wherein
   implementing the I-cache locking policy further includes:
      for each I-cache entry: (i) providing a status value indicating that an instruction in the entry is security critical or non-critical, and (ii) providing a process identifier for identifying the process the security instruction belongs to; and
      during the selection of I-cache entries to be evicted, checking said status value for each entry to be evicted and selecting entries with non-critical instructions to evict from the I-cache.

7. The method of claim 6 further including setting said status values for I-cache entries that include instructions for a critical process executing a critical instruction.

8. The method of claim 7, wherein implementing the I-cache locking policy further includes:
   during update of an I-cache entry with a security critical instruction, setting said status value and the process identifier for the entry, to indicate that the I-cache entry includes a security critical instruction; and
   upon completion of a process, resetting the I-cache entry status values that contain instructions belonging to the completed process.

9. The method of claim 7 further comprising:
   partitioning the I-cache into multiple logical partitions; and
   sharing access to the I-cache by an I-cache mapping policy that provides access to each I-cache partition by only one logical processor;
   wherein implementing an I-cache locking policy further includes implementing an I-cache locking policy for each cache partition, to prevent unauthorized eviction of an instruction from the corresponding I-cache partition.

10. The method of claim 9, wherein partitioning the I-cache further includes partitioning the I-cache into multiple logical partitions corresponding to multiple logical processors.

11. The method of claim 10 further including: upon detecting execution of a critical process on a logical processor, dynamically partitioning the I-cache into multiple logical partitions.

12. The method of claim 11, wherein detection of a critical process includes detecting a process executing an instruction to identify the process as a critical process or to identify critical code sections.

13. The method of claim 10, wherein providing access to each I-cache partition further includes providing access to each I-cache partition only by a corresponding logical processor and preventing access to the said partition by other logical processors.

14. The method of claim 13, wherein preventing access to the I-cache by said other logical processors includes dynamically repartitioning the I-cache to only allow access to the I-cache by the processor executing a critical process.

15. The method of claim 9 wherein:
   partitioning the I-cache includes modifying the mapping index of the I-cache to include a logical processor identification; and
   sharing access to the I-cache includes allowing access to different partitions of the I-cache by an I-cache mapping policy based on the logical processor identification.

16. The method of claim 6, wherein instruction processing is implemented on a simultaneous multithreading (SMT) processor.

17. An instruction cache system, comprising:
   an instruction cache (I-cache); and
   a cache manager configured for implementing an I-cache locking policy to prevent unauthorized eviction and replacement of security critical instructions in the I-cache;
   wherein the cache manager is further configured for implementing the I-cache locking policy including, providing for each I-cache entry a status value indicating that an instruction in the entry is security critical or non-critical, during the selection of I-cache entries to be evicted, checking said status value for each entry and selecting entries with non-critical instructions to evict from the I-cache.

18. The system of claim 17, further including, for each I-cache entry: (i) a status value indicating that an instruction in the entry is security critical or non-critical, and (ii) a process identifier for identifying the process the security instruction belongs to.

19. The system of claim 17, wherein the cache manager is further configured for setting said status values for I-cache entries that include instructions for a critical process executing a critical instruction.

20. The system of claim 17, wherein the cache manager is further configured for:
   partitioning the I-cache into multiple logical partitions; and
   sharing access to the I-cache by an I-cache mapping policy that provides access to each I-cache partition by only one logical processor;
   wherein implementing an I-cache locking policy further includes implementing an I-cache locking policy for each cache partition, to prevent unauthorized eviction of an instruction from the corresponding I-cache partition.

21. The system of claim 20, wherein the cache manager is configured for partitioning the I-cache into multiple logical partitions corresponding to multiple logical processors.

22. The system of claim 17, wherein the instruction processing is implemented on a simultaneous multithreading (SMT) processor.

23. An instruction cache system, comprising:
   an instruction cache (I-cache); and
   a cache manager configured for implementing an I-cache locking policy to prevent unauthorized eviction and replacement of security critical instructions in the I-cache wherein the cache manager is further configured for implementing the I-cache locking policy including, providing for each I-cache entry: (i) a status value indicating that an instruction in the entry is security critical or non-critical, and (ii) a process identifier for identifying the process the security instruction belongs to, and during the selection of I-cache entries to be evicted, checking said status value for each entry and selecting entries with non-critical instructions to evict from the I-cache.

24. The system of claim 23, wherein the cache manager is further configured for setting said status values for I-cache entries that include instructions for a critical process executing a critical instruction.

25. The system of claim 24, wherein the cache manager is further configured for implementing the I-cache locking policy by:
   during update of an I-cache entry with a security critical instruction, setting said status value and the process identifier for the entry, to indicate that the I-cache entry includes a security critical instruction; and
   upon completion of a process, resetting the I-cache entry status values that contain instructions belonging to the completed process.

26. The system of claim 24, wherein the cache manager is further configured for:
   partitioning the I-cache into multiple logical partitions; and
   sharing access to the I-cache by an I-cache mapping policy that provides access to each I-cache partition by only one logical processor;
   wherein implementing an I-cache locking policy further includes implementing an I-cache locking policy for each cache partition, to prevent unauthorized eviction of an instruction from the corresponding I-cache partition.

27. The system of claim 26, wherein the cache manager is configured for partitioning the I-cache into multiple logical partitions corresponding to multiple logical processors.

28. The system of claim 27, wherein the cache manager is configured for, upon detecting execution of a critical process on a logical processor, dynamically partitioning the I-cache into multiple logical partitions.

29. The system of claim 28, wherein the cache manager is configured for detection of a critical process by detecting a process executing an instruction to identify the process as a critical process or to identify critical code sections.

30. The system of claim 27, wherein the cache manager is configured for providing access to each I-cache partition only by a corresponding logical processor and preventing access to the said partition by other logical processors.

31. The system of claim 30, wherein the cache manager is configured for preventing access to the I-cache by said other logical processors by dynamically repartitioning the I-cache to only allow access to the I-cache by the processor executing a critical process.

32. The system of claim 26, wherein the cache manager is configured such that:
  partitioning the I-cache includes modifying the mapping index of the I-cache to include a logical processor identification; and
  sharing access to the I-cache includes allowing access to different partitions of the I-cache by an I-cache mapping policy based on the logical processor identification.

33. The system of claim 23, wherein instruction processing is implemented on a simultaneous multithreading (SMT) processor.

* * * * *